United States Patent [19]

Webb et al.

[11] 4,276,960
[45] Jul. 7, 1981

[54] OIL DISTRIBUTING MEANS

[75] Inventors: Paul D. Webb, Tioga, Pa.; William J. Kiefer; James M. Aumick, both of Addison, N.Y.

[73] Assignee: Ingersoll-Rand Company, Woodcliff Lake, N.J.

[21] Appl. No.: 39,811

[22] Filed: May 17, 1979

[51] Int. Cl.³ .................................................. F04B 39/02
[52] U.S. Cl. .................................. 184/6.22; 137/115; 137/529; 417/228
[58] Field of Search .................... 184/6.3, 6.4, 6, 6.11, 184/6.6, 6.21; 417/228; 137/115, 529

[56] References Cited
U.S. PATENT DOCUMENTS

| 3,090,365 | 5/1963 | Constantino | 184/6.22 X |
| 3,429,502 | 2/1969 | Lundrik | 417/228 |
| 3,578,014 | 5/1971 | Gachot | 137/115 |
| 4,114,571 | 9/1978 | Ruf | 184/6.22 X |
| 4,171,712 | 10/1979 | DeForrest | 137/529 |
| 4,180,089 | 12/1979 | Webb | 137/115 |

Primary Examiner—David H. Brown
Attorney, Agent, or Firm—Bernard J. Murphy

[57] ABSTRACT

The invention comprises a novel oil distributing arrangement, employing a valve which has a plurality of responses, for use in a gas compressing system or the like. The valve has a plurality of ports for admitting oil thereinto from an oil pump via a cooler, and for discharging oil therefrom, to a gas compressor (or some such similar oil-using end item) or for by-passing oil directly back to the oil pump (or a pump-serving oil reservoir), or for by-passing the cooler, etc. A translating valving element opens and closes communication between different oil admittance and oil discharge ports in the valve, in response to discrete ranges of valve-operating fluid pressures addressed to the valving element, to effect the cited by-passing functions, and to maintain a fairly uniform pump output pressure level.

17 Claims, 2 Drawing Figures

OIL DISTRIBUTING MEANS

This invention pertains to oil distributing systems for use with oil-using equipments, and in particular to oil distributing means for a gas compressor, or the like, which uses oil for lubrication and cooling, which may use oil for injection thereof into the compression chamber(s), and which may use oil also for loading thrust pistons.

In gas compressing systems, for instance, which employ positive-pressure, full-flow oil distribution, an oil pump relief valve is typically required for system starting with cold oil. Also, with extremely cold oil, a high pressure drop occurs across the oil cooler, on start up, and systems subject to this condition require means to by-pass the cooler (and the typical oil-mixing valve), so as to supply oil directly from the pump to the end item (i.e., gas compressor).

Also, such systems, such gas compressing systems, require a means of shuting off the compressor injection oil and bearing oil when the compressor is shutdown. This is necessary to prevent oil from continuing to flow out of the cooler and flooding the air end (i.e., the compressor) on shutdown. On air ends (compressors) utilizing thrust pistons, a uniform oil pressure, for loading of said thrust pistons, is desired for all operating speeds.

It is an object of this invention to set forth an oil distributing means which simply and efficiently meets the aforesaid needs and requirements. Particularly, it is an object of this invention to set forth an oil distributing means, for a gas-compressing or like system, comprising a housing having a given chamber formed therewithin; a first port formed in said housing, and opening into said chamber at a first location, for admitting oil into said chamber; a second port formed in said housing, and opening into said chamber at a second location spaced apart from said first location, for discharging oil from said chamber; valving means slidably disposed in said chamber; said valving means having closure means for closing off said first and second ports from communication with each other, in a first slidable disposition of said valving means, and for opening said first and second ports to mutual communication, in a second slidable disposition of said valving means; and means biasing said valving means in said first disposition; wherein said biasing means comprises means urging said valving means toward said first disposition with a first range of biasing forces, upon said valving means slidably moving away from said first disposition and in the direction of said second disposition, through a first, given distance of slidable movement thereof, and with a second range of biasing forces, upon said valving means slidably moving in said direction through a second distance beyond said first, given distance; and further including means for addressing a counter-biasing force to said valving means to effect slidable movement thereof in said direction.

Further objects of this invention, as well as the novel features thereof, will become more apparent by reference to the following description taken in conjunction with the accompanying figures, in which.

Figure 1:
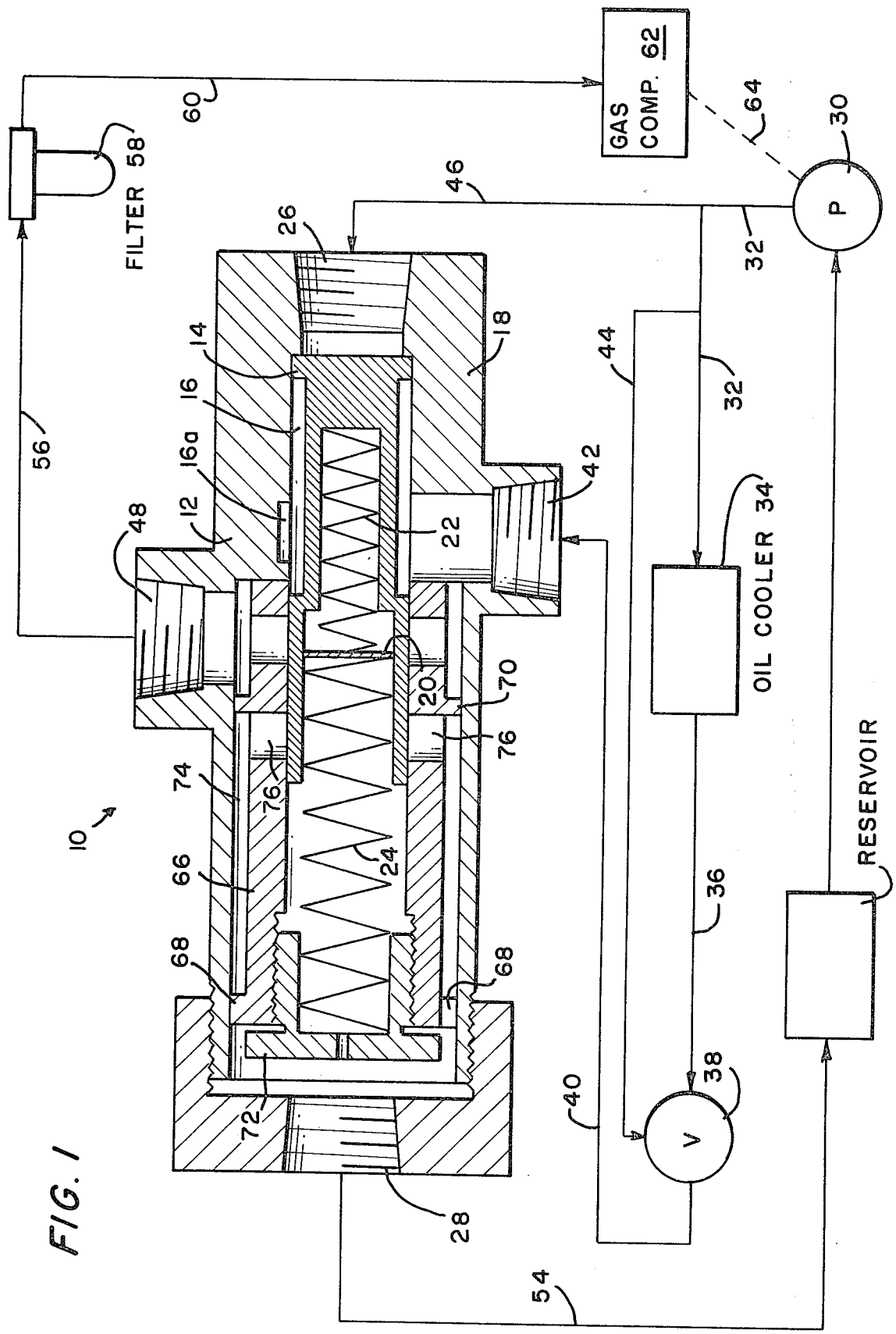
FIG. 1 is a combination schematic diagram and cross-sectional view of an embodiment of the novel oil distributing means, the same showing the by-pass valve in cross-section, and the interconnected system components is diagrammatic outline, in which the valve is shown in a quiescent or at rest disposition.

As shown in the figures, an embodiment 10 of the novel oil distributing means, comprises an oil by-pass valve 12. The valve 12 consists of a movable piston 14 that slides in an inner cylindrical chamber 16 that is formed in the valve body 18. Two compression springs, with an intervening disc 20, are used to bias the piston 14 to the normal or quiescent positioning thereof shown in FIG. 1. These are a low force spring 22 and a high force spring 24. The piston translates in the chamber 16 in response to the pressure differential obtaining in the chamber 16 between a port 26 and a port 28 formed in the valve body.

The novel oil distributing means 10 comprises an oil pump 30 having an outlet which, by means of a conduit 32, supplies oil to an oil cooler 34. The oil cooler has an outlet which, by means of a conduit 36, supplies cooled oil to an oil mixing valve 38. In turn, a conduit 40 supplies oil, from the mixing valve, to another port 42 formed in the valve body 18. Another conduit 44 communicates the mixing valve directly with the outlet of pump 30, by its connection with conduit 32. Further an additional conduit 46 also directly communicates with the outlet of pump 30, by its connection with conduit 32, and opens onto the aforementioned port 26.

Outlets from valve 12 are provided by the aforesaid port 28, and a further port 48 formed in the valve body 18. Oil discharge from port 28 is conducted, via a conduit 54, to the inlet side of the pump 30. Oil discharge from port 48 is conducted, via a conduit 56 to an oil filter 58 and, in turn, from the filter, via a conduit 60 to a gas compressor 62. A dashed line 64, interconnecting the compressor 62 and pump 30 signifies that the compressor drives the pump.

Figure 2:
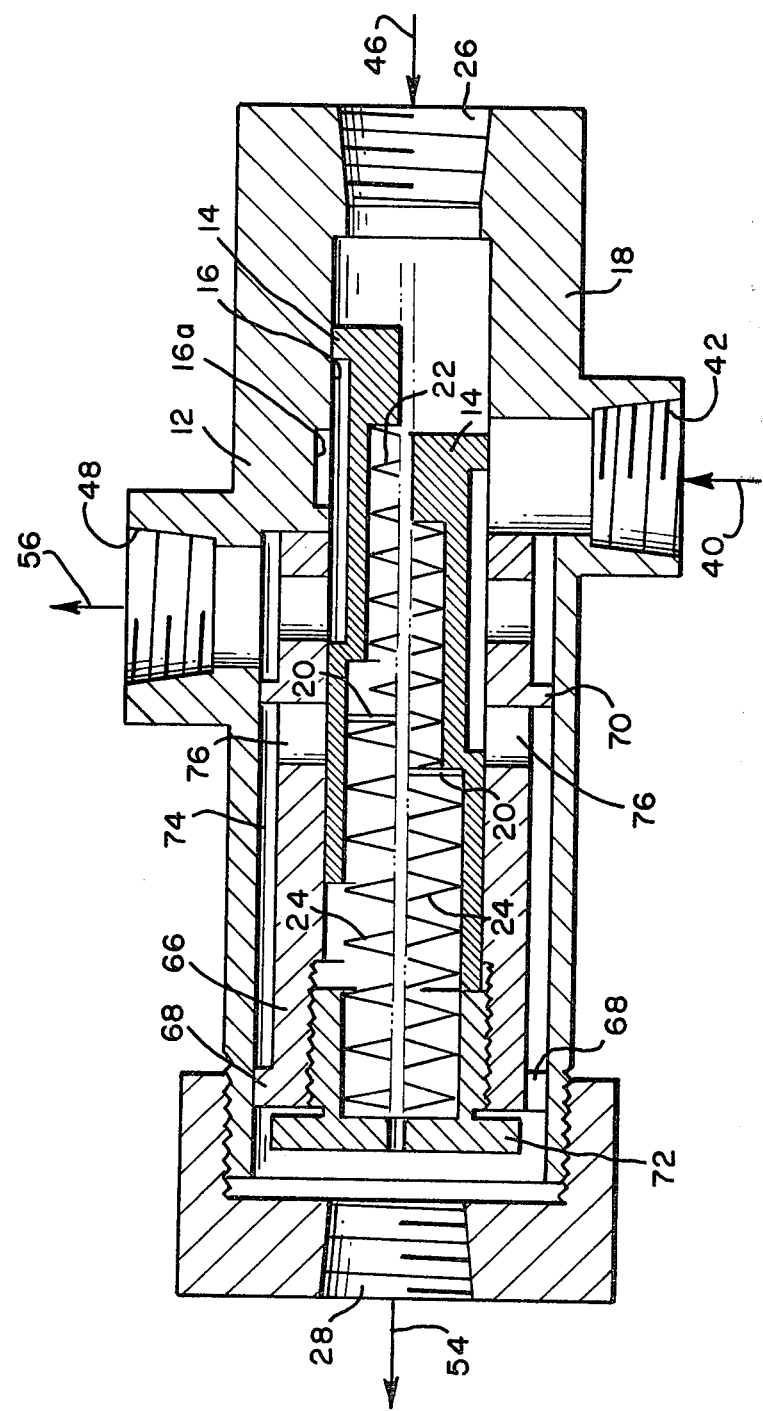
FIG. 2 is an outlined diagram of the means of FIG. 1 showing the valving element and the springs therefor divided, lengthwise, to show the operation of the valve in first and second dynamic dispositions.

With the piston 14 to the far right, as shown in FIG. 1, the compressor 62 is shut down and there is no pressure in the oil distributing system. As the compressor is started and the oil pump 30 develops a five to ten pounds per square inch (0.3515 to 0.703 kg. per sq. cm.) pressure differential between ports 26 and 28, the piston 14 moves to the left and, as seen in FIG. 2, opens port 48. This provides a free flow of oil from port 42 to port 48 with minimum pressure drop (as a constant flow area is maintained through the valve 12). Then, as the aforesaid pressure differential reaches approximately forty to fifty pounds per sq. inch (2.812 to 3.515 kg. per sq. cm.), oil will by-pass from ports 42 and 48 to the pump inlet through port 28. The valve 12 would be in this disposition during normal operation of the compressor 62.

With the latter pressure differential oil is by-passed, via port 28, to the inlet of pump 30, as aforesaid, in this way. The valve 12 has a sleeve 66 disposed therein which is spaced apart, by ribs 68, and an annular land 70, from the inside surface of body 18. The sleeve 66, capped at one end with a closure 72, defines the cylinder in which the piston 14 translates, and also confines the piston-biasing springs 22 and 24. The annular void, between sleeve 66 and the inside surface of body 18, defines a second oil chamber 74. Port 28 opens onto the chamber 74, and the latter communicates with chamber 16 via apertures or passageways 76 formed in the sleeve 66—depending upon the positioning of piston 14.

If the compressor 62 was started with a cold ambient, and the oil cooler 34 therefore had a high pressure drop (when the mixing valve 38 switched to flow oil through the cooler) the right hand edge of the piston 14 will uncover an enlarged area 16a of chamber 16. At this time, oil from port 26 will by-pass the cooler 34 and either flow through port 48 to the gas compressor 62 or through port 28 to the inlet of the pump 30 (via the reservoir 52).

As the piston 14 first travels it only contacts the low force spring 22. This permits the aforesaid low pressure differential, between ports 26 and 28, to completely open the oil supply conduit 40 to the chamber 16, port 48, and conduit 56. Then the piston 14 contacts the heavy spring 24 and the pressure regulation is maintained thereby, i.e., by spring 24.

As the piston 14 translates, and regulates the pump 30 oil pressure, it is not on or near a valve seat. The regulation is brought about as the ports in body 18 are uncovered by the piston 14. These are gradual openings; therefore, pulsations are substantially eliminated.

When the compressor 62 is shut down, the piston 14 moves to the far right, as the aforesaid pressure differential drops to the five pounds per sq. inch (0.3515 kg. per sq. cm.) value. Therefore, the by-pass valve 12 serves as a stop valve in the compressor oil supply.

The invention provides a reliable means of closing off the oil supply to the compressor 62 on shut down. The valve 12 is much more reliable than a solenoid valve, in opening or closing as the compressor 62 is operated. Too, the valve 12 does not cause a pressure drop in the oil system after it opens (as would an inline spring-loaded check valve). Discharge pressure control for the oil pump 30 is provided by the valve 12, and the piston 14 uncovers ports gradually (rather than lifting off a seat, to cause extreme pressure and flow pulsations). The feature providing by-pass of the oil cooler 34 is provided at virtually no significant expense as the piston 14 in the by-pass valve 12 merely uncovers an additional port to provide same. In that the valve 12 tries to maintain a fixed pressure differential, it helps to maintain a constant thrust piston differential at all compressor operating speeds—if the compressor 62 employs such thrust pistons.

While we have described our invention in connection with a specific embodiment thereof, it is to be clearly understood that this is done only by way of example and not as a limitation to the scope of the invention as set forth in the objects thereof and in the appended claims.

We claim:

1. Oil distributing means, for a gas-compressing or like system, comprising:
    a housing having a given chamber formed therewithin;
    a first port formed in said housing, and opening into said chamber at a first location, for admitting oil into said chamber;
    a second port formed in said housing, and opening into said chamber at a second location spaced apart from said first location, for discharging oil from said chamber;
    valving means slidably disposed in said chamber;
    said valving means having closure means for closing off said first and second ports from communication with each other, in a first slidable disposition of said valving means, and for opening said first and second ports to mutual communication, in a second slidable disposition of said valving means; and
    means biasing said valving means in said first disposition; wherein
    said biasing means comprises means urging said valving means toward said first disposition with a first range of biasing forces, upon said valving means slidably moving away from said first disposition and in the direction of said second disposition, through a first, given distance of slidable movement thereof, and with a second range of biasing forces, upon said valving means slidably moving in said direction through a second distance beyond said first, given distance; and further including
    means for addressing a counter-biasing force to said valving means to effect slidable movement thereof in said direction.

2. Oil distributing means, according to claim 1, wherein:
    said biasing means comprises means which yieldably accommodates a slidable movement of said valving means through said first distance at a first acceleration rate, and through said second distance at a second acceleration rate; in response to a uniformly increasing counter-biasing force addressed to said valving means via said force-addressing means.

3. Oil distributing means, according to claim 1, wherein:
    said valving means comprises an elongate valving element; and
    said counter-biasing force addressing means comprises an aperture formed in said housing, and opening onto one end of said elongate valving element, for introducing a counter-biasing force therethrough to said one end of said element.

4. Oil distributing means, according to claim 3, wherein:
    said valving element is responsive to a counter-biasing range of fluid-pressure forces, of from approximately zero to ten pounds per square inch (0 to 0.703 kg. per sq. cm.), to open communication between said first and second ports.

5. Oil distributing means, according to claim 3, wherein:
    said aperture comprises a third port, opening onto said chamber at a location spaced apart from said first and second locations, for admitting oil under pressure thereinto.

6. Oil distributing means, according to claim 5, wherein:
    said valving element is responsive to a counter-biasing range of fluid-pressure forces, of from approximately forty to fifty pounds per square inch (2.812 to 3.515 kg. per sq. cm.), to open communication between said first, second and third ports.

7. Oil distributing means, according to claim 5, wherein:
    said housing has an other chamber formed therewithin; and further including
    a fourth port, opening onto said other chamber, for discharging oil therethrough from said other chamber;
    a passageway for communication said given and other chambers; and wherein
    said closure means comprises means for closing off said passageway, and for opening said passageway, to prohibit and to accommodate communication between said given and other chambers, respectively.

8. Oil distributing means, according to claim 7, wherein:

said closure means and said passageway comprise means for opening and closing communication between said first port and said other chamber.

9. Oil distributing means, according to claim 7, wherein:
said valving element is responsive to: (a) a first range of counter-biasing forces to open communication between said first and second ports, and (b) a second range of counter-biasing forces to open communication between said given and other chambers, and said first, second, third and fourth ports.

10. Oil distributing means, according to claim 7, wherein:
said valving element is responsive to a counter-biasing range of fluid-pressure force, of from approximately forty to fifty pounds per square inch (2.812 to 3.515 kg. per sq. cm.), to open communication between said given and other chambers, and said first, second, third and fourth ports.

11. Oil distributing means, according to claim 7, further including:
a source of pressured oil in communication with said third port.

12. Oil distributing means, according to claim 11, further including:
a gas compressor in communication with said second port.

13. Oil distributing means, according to claim 12, further including:
a conduit communicating said fourth port with said source.

14. Oil distributing means, according to claim 13, further including:
a reservoir interposed in said conduit between said source and said fourth port.

15. Oil distributing means, according to claim 12, further including:
an oil cooler; and
a conduit communicating said oil cooler with said first port.

16. Oil distributing means, according to claim 15, further including:
a mixing valve interposed in said conduit between said oil cooler and said first port.

17. Oil distributing means, according to claim 16, wherein:
said cooler has an inlet and an outlet; and
said conduit communicates with said oulet; and further including
means communicating said source with said inlet; and wherein
said conduit and said communicating means are in communication.

* * * * *